Figure 1:
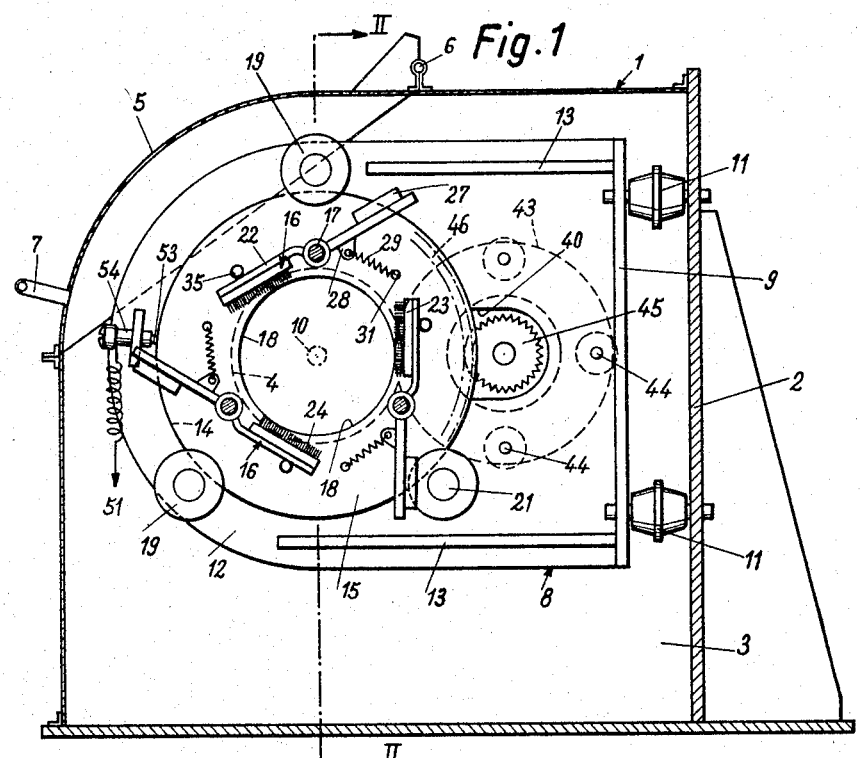

Aug. 9, 1966 P. CATHELIN ETAL 3,265,966
DEVICE HAVING CENTRIFUGAL FORCE RESPONSIVE MEANS FOR THE
DETECTION OF FAULTS IN THE INSULATING SHEATH
OF ELECTRIC CABLES AND THE LIKE
Filed July 24, 1963 3 Sheets-Sheet 1

INVENTORS
PAUL CATHELIN AND
CHRISTIAN VAN DEN BURG
BY Irvin S. Thompson
ATTORNEY Aug. 9, 1966 P. CATHELIN ETAL 3,265,966
DEVICE HAVING CENTRIFUGAL FORCE RESPONSIVE MEANS FOR THE
DETECTION OF FAULTS IN THE INSULATING SHEATH
OF ELECTRIC CABLES AND THE LIKE
Filed July 24, 1963 3 Sheets-Sheet 3

INVENTORS
PAUL CATHELIN AND
CHRISTIAN VAN DEN BURG
BY Irwin S. Thompson
ATTORNEY 3,265,966
DEVICE HAVING CENTRIFUGAL FORCE RESPONSIVE MEANS FOR THE DETECTION OF FAULTS IN THE INSULATING SHEATH OF ELECTRIC CABLES AND THE LIKE
Paul Cathelin, Nogent-sur-Marne, and Christian Van den Burg, Vincennes, France, assignors to Société dite: Trefimetaux, Paris, France
Filed July 24, 1963, Ser. No. 297,302
7 Claims. (Cl. 324—54)

This invention relates to a device for the continuous electrical testing of the insulating outer sheath of an electrical cable, bar, section or the like elongated member of the kind comprising an electrically conductive core sheathed in an insulating material, such as rubber, plastics or the like.

Various devices are already known for the electrical detection of insulation faults in insulating coverings of the above kind. Such devices, which are frequently disposed at the outlet of an extruding machine, comprise a high-tension generator in the form of a transformer delivering a voltage of generally between 3 and 50 kv. This voltage is applied between earth, to which the core of the cable or the like is also connected, and metal elements for exploring the surface of the insulating covering of the cable. Any fault in the insulating sheath is detected as a variation in the current in the circuit connecting the two poles of the source. This variation enables the fault to be marked.

In a first known system suitable, for example, for cables from 2 to 10 mm. outside diameter, the detection means are in the form of strings of metal beads forming a curtain through which the cable passes so that the beads come into contact with the surface of the cable.

In another construction suitable for larger diameter cables, springs are grouped on a frame and move apart to allow the cable to pass therethrough.

These two systems have the disadvantage that the contact with the outer surface of the cable is imperfect, so that some longitudinal strips of the cable are not explored.

It is an object of the present invention to obviate these disadvantages.

Another object of the invention is to provide a testing device suitable for a large range of electric cables outer diameters, without necessitating a particular adjustment of the faults exploratory system.

To this end, according to the invention, the device which provides automatic and continuous detection of faults in the insulating sheath of a cable or the like and which comprises a live exploratory system in contact with the surface of the sheath is characterised essentially in that the exploratory system consists of brushes which are held in contact with the sheath and which are carried by a rotary ring through which the cable passes axially, a drive mechanism being provided for rotation of said ring at a speed such that, allowing for the rate of feed of the cable, the helical paths described on the sheath by the brushes overlap one another.

In a preferred embodiment of the invention, the brushes are metal brushes each of which is connected to the rotary ring for pivoting about an axis parallel to the ring axis, said brushes being provided with counterweights which tend to apply them to the cable sheath under the action of centrifugal force so that the pressure of the brushes on the cable sheath automatically increases with the diameter of the cable and with the speed of rotating of the ring.

Figure 2:
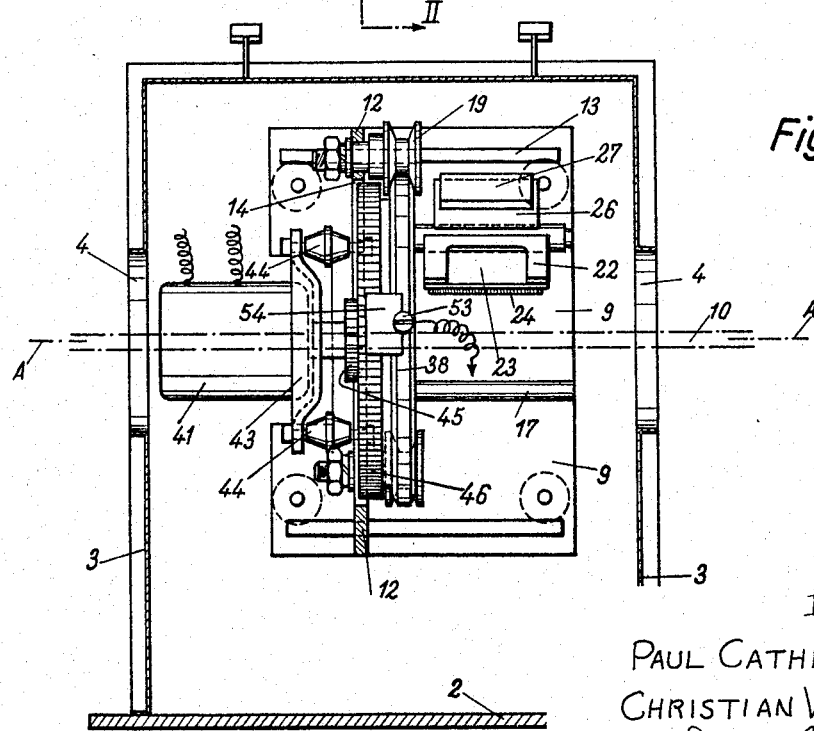
Figure 3:
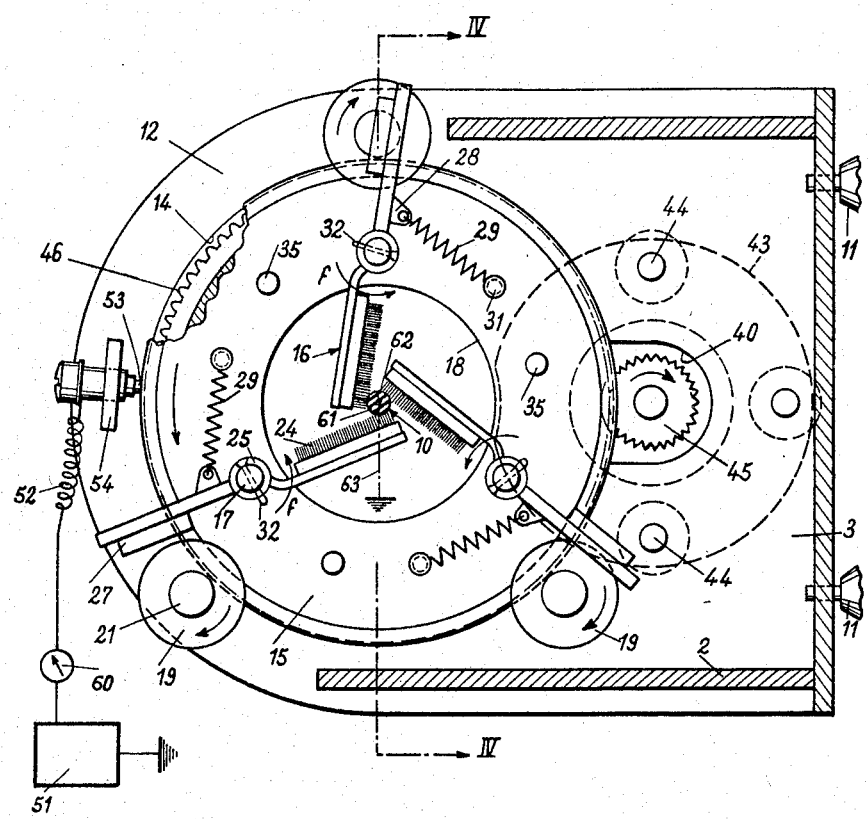
Figure 4:
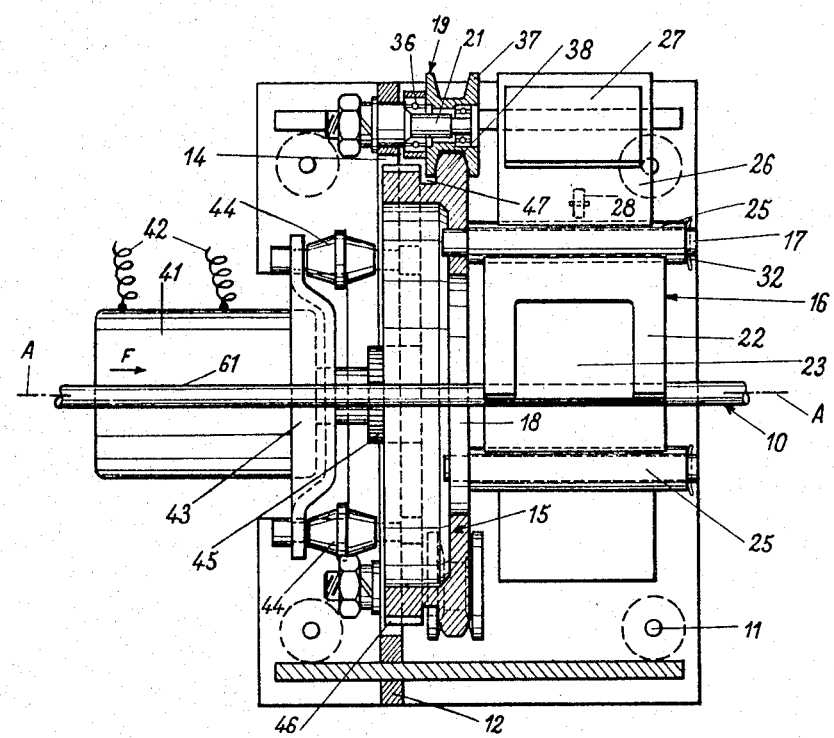

Other features of the invention will be apparent from the following description of a preferred embodiment of the invention given by way of example with reference to the accompanying drawings, in which:

FIGURE 1 is a partial cross-section of a rotary fault detector in the inoperative position,
FIGURE 2 is an axial section taken on the line II—II in FIGURE 1, some of the brushes being removed, the central part not being shown in section,
FIGURE 3 is a cross-section to a larger scale with the brush-carrier ring and the ring support broken away, the system being in the operative position, and
FIGURE 4 is an axial section taken on the line IV—IV in FIGURE 3, with some of the brushes removed.

The embodiment shown in the drawings relates to a device for automatic detection of insulation faults on electric cables of a diameter, for example of between 10 and 120 mm.

This device is housed inside a casing 1 formed by an angle section 2 provided with a thin sheet-metal covering whose side walls 3 are apertured at 4 for the passage of the cable 10. The cover 3 is provided with a movable lid 5 hinged at 6 and provided with a handle 7. The actual detection system is housed inside the casing 1 and is mounted on a frame 8 comprising a vertical plate 9 fixed by insulators 11 to the angle section 2.

An apertured support plate 12 is mounted perpendicularly to the plate 9, the complete system being stiffened by transverse stiffeners 13.

The support 12 is formed with a circular aperture 14 coaxial with the apertures 4 in the casing 3, the corresponding horizontal axis A—A being the axis along which the cable 10 to be checked moves.

The exploratory system provided according to the invention for the continuous examination of the cable sheath is mounted rotatably on the support 12. This system comprises essentially a ring 15 carrying a group of brushes which, in the example illustrated, consist of brushes 16 pivotable on pivots 17 and distributed about a central aperture 18 centered on the axis A—A. The ring 15 is guided in rotation by rollers 19 distributed over the periphery of the ring and mounted rotatably on the support 12 by means of spindles 21.

The construction of this system will now be described in detail with reference to FIGURES 3 and 4.

The brushes 16, of which three are provided in the example described, comprise a front U-shaped mounting 22 to which there is detachably secured a metal baseplate 23 of appreciable width carrying a group of closely set metal bristles 24 (for example of brass or copper wire). The mounting 22 is rigidly connected to a bush 25 disposed on the spindles 17 which are disposed on the ring 15 and are directed in parallel relationship to the axis A—A. On the opposite side to the mounting 22 with respect to the bush 25 is provided a second mounting 26 carrying a counterweight 27 and a lug 28 for securing a spring 29 whose other end is secured to a stud 31 on the ring 15. Each brush 16 is detachably mounted on the corresponding rod 17 by slipping the brush 25 over the rod 17 and securing the system by a split pin 32.

The action of the springs 29 is such that in the inoperative state the heads of the brushes 16 are retracted as shown in FIGURE 1 and bear against studs 35 provided for this purpose. The aperture 18 in the ring 15 is then completely free for introduction of the cable 10 into the apparatus.

The rollers 19 mounted on bearings 36 disposed about spindles 21 come into contact by their double flanks 37 with a ring 38 of trapezoidal section forming part of the ring 15. This guide system accurately determines the axis of rotation of the ring 15.

Means are also provided for rotating the ring 15 at an adequate angular velocity. In the example under consideration, these means comprise an electric motor 41 fed through leads 42 mounted in a cap 43 which is in turn secured by insulators 44 to the support plate 12. The axis of the motor 41 is parallel to the axis A—A but is offset transversely with respect to the latter so that a motor gear wheel 45, which is of insulating material and which is fitted into an opening 40 (FIGURE 3) in the support 12, can engage teeth 46 provided on the ring 15 parallel to the ring 38 and separated therefrom by an annular groove 47 permitting rotation of the ring 15 while allowing the required clearance for the flanks 37 of the guide rollers 19.

The electric circuit of the system is as follows:

The ring 15 is connected to one of the poles of the high-tension source 51 by a lead 52 extending to a brush 53 supported by a lug 54 of the support 12 and pressed by resilient means (not shown) against the rim of the ring 38. To provide good contact and reduced friction the ring 38 is made of bronze. The ring 15 thus receives voltage, and the same applies to the rollers 19, the support 12 and the brushes 16. On the other hand, the insulators 11 prevent the high voltage from being transmitted to the casing 1 while the insulators 44 protect the motor 41.

The detection device is used as follows: the cable 10 to be checked passes through the detector in the direction of the axis A—A and moves in the direction F under the action of drive means and tensioning means (not shown). The cable core 62 is earthed through connection 63 and the same applies to the other terminal of the high-tension source 51. At the same time the ring 15 is rotated by the motor 41 whose gear wheel 45 rotates the teeth 46.

As a result of this rotation the counterweights 27 tend to assume the maximum off-centre position and hence cause each brush 16 to pivot on itself in the direction f indicated (FIGURE 3) until the metal bristles 24 come into contact with the insulating sheath 61 of the cable. This movement is permitted by the extension of the springs 29. For a given rate of rotation of the ring 15 the springs provide optimum pressure of the bristles 24 on the sheath 61, good contact, and avoid any excessively rapid damage to the bristles.

The rate of rotation of the ring 15 is selected according to the rate of movement of the cable 10 so that the helical strips corresponding to the contact zones of the bristles 24 on the insulating sheath overlap one another thus ensuring integral inspection of all the surface of the insulating sheath 61. Allowing for the width of the brushes 16, such a result can readily be obtained throughout the range of cable diameters in question (10 to 120 mm.) for speeds of rotation of about 200 r.p.m., the testing voltage being substantially comprised between 2,000 and 50,000 volts according to the width of the insulating sheath 61.

In the event of an insulation fault on the surface of the cable, the current delivered by the source 51 rises abruptly when the bristles 24 of a brush 16 come into contact with the fault. This variation may be detected by any appropriate system disposed in the corresponding circuit, for example an ammeter 60, or an overcurrent relay.

It will be seen that the contact pressure of the bristles 24 on the cable surface increases with the speed of rotation of the ring. Other things being equal, this pressure also increases with the outside diameter of the cable. These two factors have a very favourable effect on the accuracy of the system.

Within the scope of the appended claims the invention is of course not limited to the embodiment described and numerous modifications may be made to the same. In particular, the number of brushes may be changed. Moreover, the brushes need not be in the form of brushes with metal bristles but could be in the form of pads or in the form of springloaded brushes similar to the brush 53. The latter system, however, has the disadvantage that the centrifugal force reduces the pressure on the cable to be measured as the angular velocity of the ring increases.

What we claim is:

1. Apparatus for the automatic and continuous dielectric testing of the insulating sheath of an elongated element comprising an electrically conductive core embedded within an insulating sheath, the apparatus comprising a stationary support having an aperture provided therein for movement therethrough of said elongated element to be tested, a ring rotatably mounted on said support, said ring being adjacent said support aperture and being axially traversed by said elongated element, means to rotate the ring about its axis, brush means carried by the ring, means yieldably urging the brush means toward said axis to engage said insulating sheath, means to establish a difference of potential between said brush means and said conductive core, means to detect the passage of current between said brush means and said conductive core, said yieldably urging means comprising means mounting the brush means for swinging movement about at least one axis parallel to the axis of rotation of the ring, and weight means connected to the brush means to swing outwardly under the influence of centrifugal force upon rotation of the ring to swing the brush means inwardly.

2. Apparatus for the automatic and continuous dielectric testing of the insulating sheath of an elongated element comprising an electrically conductive core embedded within an insulating sheath, the apparatus comprising a stationary support having an aperture provided therein for movement therethrough of said elongated element to be tested, a ring rotatably mounted on said support, said ring being adjacent said support aperture and being axially traversed by said elongated element, at least one brush provided with metallic bristles pivotally fitted on said ring, said bristles being located on said brush so as to engage said insulating sheath when said brush is pivoted in the direction thereof, centrifugal means carried by said brush and tending to move said bristles towards said sheath when said ring is rotated, means to establish a difference of potential between said brush bristles and said conductive core, means to detect the passage of current between said brush bristles and said conductive core, and means to rotate said ring at such a speed that said brush bristles engage said insulating sheath.

3. Apparatus as claimed in claim 2, and resilient means acting opposite to said centrifugal means connecting said brush to said ring and tending to move said brush towards a rest position away from the path of said element.

4. Apparatus as claimed in claim 2, said brush comprising a bush pivotally fitted on a spindle secured to said rotary ring and parallel to the axis thereof, said bush bearing two rigid mountings radially projecting therefrom, a base plate provided with a group of closely set metal bristles projecting therefrom detachably secured to one of said mountings, and a counterweight secured to the second one of said mountings in a position remote from said bristles relatively to aid spindle.

5. Apparatus as claimed in claim 2, wherein said stationary support is housed in a protective casing comprising two side walls and a pivoting lid, said side walls having apertures provided therein adjacent to said support apertures.

6. Apparatus as claimed in claim 2, said means to rotate said ring comprising an electric driving motor mounted on said support and insulated therefrom, gearing means in driving engagement with said motor and said ring, said brush being connected to said electric source and mounted on said support, and resilient means engaging said brush with the ring outer surface.

7. Apparatus for the automatic and continuous dielectric testing of the insulating sheath of an elongated element comprising an electrically conductive core embedded within said insulating sheath, the apparatus comprising a frame, a support secured to said frame but electrically insulated therefrom, said support having an aperture provided therein for movement therethrough of said elongated element to be tested, guide rollers rotatably mounted on said support and spaced about said support aperture, a conductive ring rotatably carried by said support rollers, said ring being adjacent said support aperture and being axially traversed by said elongated element, at least one brush provided with metallic bristles pivotally mounted on said ring, said bristles being located on said brush so as to engage said insulating sheath when said brush is pivoted in the direction thereof, centrifugal means carried by said brush and tending to move said bristles towards said sheath when said ring is rotated, means to establish a difference of potential between said brush bristles and said conductive core, said means comprising a source of electrical voltage, a circuit connecting said source to said insulated support, means connecting said support to said rotative ring and means connecting said conductive core to said source, and means to detect the passage of current between said brush bristles and said conductive core, said detecting means comprising a current meter inserted in said connecting circuit and means to rotate said ring at such a speed that said brush bristles engage said insulating sheath.

References Cited by the Examiner

UNITED STATES PATENTS

| | | | |
|---|---|---|---|
| 2,348,157 | 5/1944 | Smith et al. | 324—54 |
| 3,042,861 | 7/1962 | Brys | 324—54 |

WALTER L. CARLSON, *Primary Examiner.*

G. R. STRECKER, *Assistant Examiner.*